United States Patent [19]
Hobza

[11] 3,834,726
[45] Sept. 10, 1974

[54] STANDING OCCUPANT PROPELLED MERCHANDISE CARRIER

[76] Inventor: Martin J. Hobza, 3314 S. 5th St., Omaha, Nebr. 68108

[22] Filed: Dec. 13, 1971

[21] Appl. No.: 207,108

[52] U.S. Cl............................ 280/87.04 R, 87.05, 280/33.99 A, 32.7, 481, 400
[51] Int. Cl............................ B60d 3/00, B62k 7/00
[58] Field of Search......... 280/87.04 R, 33.99, 32.7, 280/503, 481, 87.05, 492; 180/11

[56] References Cited
UNITED STATES PATENTS

| | | | |
|---|---|---|---|
| 1,378,793 | 5/1921 | Johnson | 280/503 X |
| 1,864,781 | 6/1932 | Wells | 280/503 X |
| 2,382,989 | 8/1945 | Gilbert | 280/87.04 R |
| 2,590,048 | 3/1952 | Sides | 280/33.99 H |
| 3,309,104 | 3/1967 | Gold | 280/87.04 R |
| 3,485,314 | 12/1969 | Herr | 180/11 X |
| 3,575,250 | 4/1971 | Dykes | 180/11 |
| 3,583,728 | 6/1971 | Cornell | 280/503 |

FOREIGN PATENTS OR APPLICATIONS

| | | | |
|---|---|---|---|
| 67,307 | 4/1929 | Sweden | 280/87.04 R |

*Primary Examiner*—Leo Friaglia
*Attorney, Agent, or Firm*—Hiram A. Sturges

[57] ABSTRACT

A standing occupant propelled merchandise cart comprising a forward container portion, wheel means supporting the forward container portion, handle means at the rear of the forward container portion and adapted to be gripped by a standing operator, an operator's riding platform having wheels under it and pivotally attached at its forward end to the forward portion whereby an operator riding on the platform can steer the forward portion, the rearward platform being suitable for propulsion in the manner of a scooter.

7 Claims, 5 Drawing Figures

PATENTED SEP 10 1974          3,834,726

INVENTOR.
Martin J. Hobza
BY Hiram A. Sturges,
Agent

STANDING OCCUPANT PROPELLED MERCHANDISE CARRIER

FIELD OF THE INVENTION

This invention is in the field of moving merchandise in warehouses, factories, and other areas.

DESCRIPTION OF THE PRIOR ART

In many warehouses, items are picked from a shelf and placed in a hand-cart of the same type commonly used in grocery stores, and such hand-carts are wheeled about the warehouse by persons walking on their feet, as is very slow.

It is not practical, however, to use a bicycle in a warehouse, even though the bicycle be outfitted with a large basket for carrying items. The space taken up by the rear wheel of a bicycle tends to make an excessive length for use in a crowded warehouse. In addition, many of the distances to be covered between stopping to pick different items from the shelves are very short distances and it is difficult to quickly attain a speed with the use of bicycle pedals. Although a speed of a bicycle is fine after it has once attained its momentum, yet its starting is slow.

In some areas powered vehicles are used, but these are very costly and have exhaust fumes that are emitted indoors. In addition, they are noisy, and even though a powered vehicle can travel speedily, yet their speed of starting from a standing stop is limited.

Probably chief among these factors is the cost of many motorized vehicles for the many persons working in a warehouse, money that is better used for inventory.

Maintenance of powered vehicles is also costly since their motors are usually running continually, even while the operator has stopped the vehicle to reach for items from warehouse shelves.

Warehouse employees who must walk on their feet pushing carts all day long find this not only slow, but tiring.

SUMMARY OF THE INVENTION

A standing occupant propelled merchandise cart comprising a forward container portion, wheel means supporting the forward container portion, handle means at the rear of the forward container portion and adapted to be gripped by a standing operator, an operator's riding platform having wheels under it and pivotally attached at its forward end to the forward portion whereby an operator riding on the platform can steer the forward portion, the rearward platform being suitable for propulsion in the manner of a scooter, the forward wheel means of the forward container portion being of the caster type for freely pivoting about a vertical axis to permit steering.

The wheel under the riding platform not being a single wheel in the center between the sides thereof as is the case with a scooter, but preferably two wheels for stability from capsizing.

Since the container portion can make use of standard merchandise carrying carts which have an elongated member extending transversely across their rearward end, therefore, an object is to provide an attachment means for the riding platform comprising two forwardly facing notched means receiving the hitch member of the merchandise cart therein, and means releasably attaching the notch means to the hitch member, a vertical pivot member attached to the notch means and suitably attached to a tongue extending rearwardly and downwardly to a connection to the underside of the platform.

The top of the platform is 3 ¾ inches or less above the floor and the platform or width is under 4 inches for facilitating "toe pushing," a method I have discovered in which frequent toe-pushing motions are used for ease of propulsion in long hours of work.

DESCRIPTION OF THE PREFERRED EMBODIMENT

Figure 1:
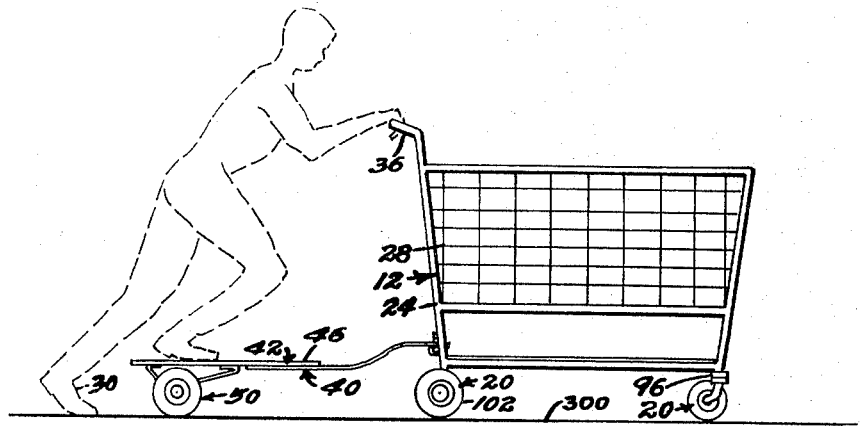
FIG. 1 is a side elevation of the new merchandise movement vehicle of this invention shown in motion across the floor surface with an operator in a starting shove position thereon in dotted lines, preparatory to later maintenance of motion by toe propulsion.

A standing occupant propelled merchandise cart or vehicle of this invention is generally indicated at 10 in FIG. 1 and comprises a forward half or forward container portion generally indicated at 12 having first wheel means generally indicated at 20 attached to and supporting the underside of a frame 24 of the forward container portion 12.

The forward container portion 12 has a wire mesh open-topped upper portion shown at 28 which is adapted to contain merchandise selected from warehouse shelves by an operator generally indicated in dotted lines at 30.

Since the forward container portion 12 can be a conventional merchandise cart, it is fortunate for the purposes of this invention, that such carts conventionally have a horizontal handle 36 extending from right to left at the top of a rearward end thereof.

The merchandise vehicle of this invention has a rearward half section generally indicated at 40 and comprising an operator's riding platform 42 which is horizontally disposed having a horizontal upper surface 46 and a horizontal lower surface 48.

A second wheel means generally indicated at 50 is disposed under the platform 42 and is spaced downwardly therefrom a substantial distance. The second wheel means 50 preferably comprises a right and a left wheel 56 and 58 which are spaced apart at the ends of a common axle 60 welded to the underside of a lower portion of a axle supporting member 64. The welding can be seen at 66.

The axle supporting portion 64 extends upwardly and forwardly from the axle 60 and has its forward end suitably attached to the platform 46 such as by means of welding at 68.

The axle supporting member 64 extends rearwardly from the axle 60 and has a rearward upper end suitably attached to the platform 46 at a rearward portion of the latter by suitable means such as welding at 72.

It is important for turning purposes that the wheels 56 and 58 have their undersurfaces 82 and 84 disposed substantially at a same point with respect to the forward end of the riding platform 46, as seen in side elevation, for ease of turning the rearward half section 40 with respect to the forward half section 12 during the turning of a corner or steering from right to left.

The wheel means 20 under the forward half section 12 must have the forward wheel means 90 at the right and 92 at the left each of a caster type, whereby they are pivotally attached to the frame 24 of the forward container portion or forward section 12 for freely pivoting about a vertical axis to permit steering.

Caster wheels conventionally have a pivotal connection as described in the position shown at 96 in FIG. 1.

Figure 3:
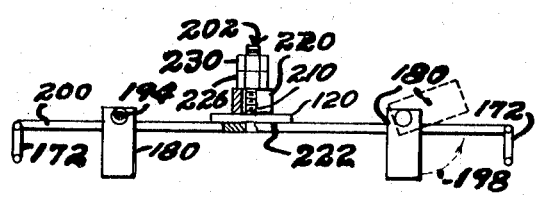
FIG. 3 is a rear elevation of the forward container portion of the merchandise movement vehicle of this invention.

The right and left rearward wheels 102 and 104 of the forward half section 12 of the vehicle can be of the sort that do not pivot about a vertical axis, but are fixed for rotation in parallel forward to rearward extending vertical planes, as best seen in FIG. 3, each pivoting about an axle 98.

Figure 2:
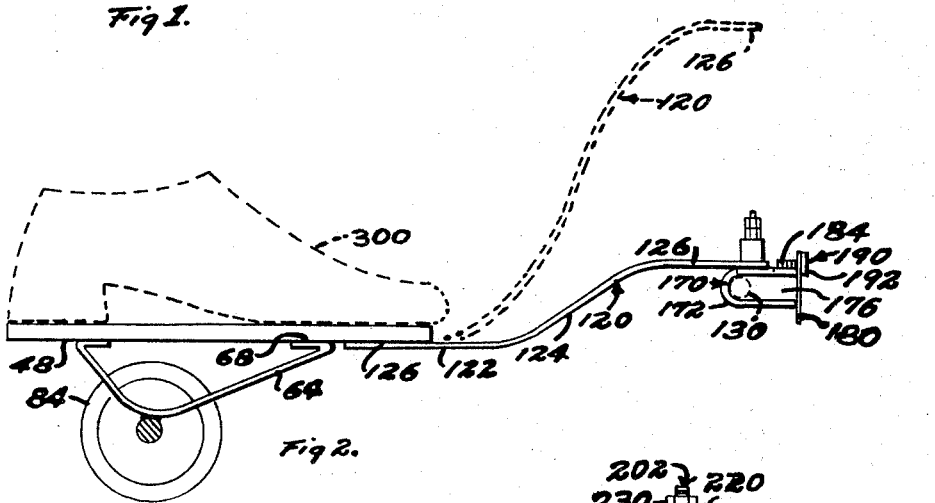
FIG. 2 is a side elevation of the rearward half of the merchandise movement vehicle of this invention shown with the closest wheel thereof removed and a portion of the axle removed, a hitch member forming a part of the forward container portion of the vehicle being shown in dotted lines, other dotted lines showing an alternate and preferred position of the tongue.
Figure 5:
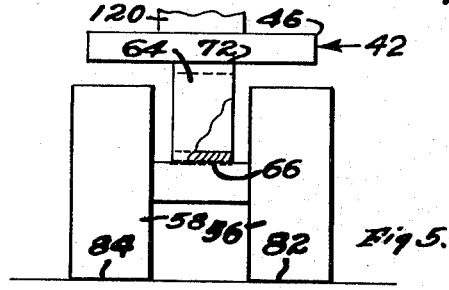
FIG. 5 is a rear elevation of the rearward half section of the vehicle of this invention with the forward portion of the tongue and parts forwardly thereof broken away and a portion of a wheel supporting member broken away and another part shown in section.

Referring now to FIG. 2, an elongated thin tongue is generally indicated at 120 and is formed of steel and has a rearward section 122 suitably secured such as by welding at 126 to the underside of the platform 42. The tongue 120 extends straight forwardly from the center of the underside of the platform 42 as seen in FIG. 5. The tongue has a central section 124 which inclines upwardly and forwardly from its rearward section 122. The tongue has a forward section 126 attached to the central section 124 and extending horizontally forward.

As best seen in FIG. 3, the forward container portion has an elongated hitch member 130 extending from side to side at the rearward end of its frame 24 and the hitch member 130 is a conventional part of a common mass-produced merchandise cart, whereby I have adapted the rearward half portion of the merchandise vehicle of this invention for attachment to this convenient hitch member 130 by means of the upward inclining central portion 124 of the tongue 120 which permits connection to the hitch member 130 without causing the platform 42 to be excessively high and so as to keep it low for stability and convenience and further to keep it low so that an operator can reach the handle 36 while standing erect on the platform 42 in a comfortable position. I say this because the handles 36 are designed at a height above the floor suitable for the average person who walks behind a shopping cart without use of the rearward half section of this invention and so it is important that the platform 42 be as low as possible to permit the comfortable reaching of the handle 36 for steering while an operator is coasting and standing erect on the platform 42.

An attachment means generally indicated at 170 is provided for attaching the elongated hitch member 130 to the tongue 120.

The attachment means 170 has two forwardly facing notched means 172 at right and left ends thereof and widely spaced apart from side to side with respect to the right and left sides of the hitch member 130. The notched means 172 each have forwardly opening notches 176 therein. The notches 176 are for the purpose of receiving opposite end portions of the hitch member 130 therein, and they are retained therein by suitable attachment means which can comprise attachment plates 180 which hang across the forward sides of the notched means 172 blocking exit of the hitch member 130 from the respective notch 176.

Each attachment plate 180 is held in position by gravity suspension from a horizontally extending portion 184 of a pivot support 190, which latter has a blocking means 192 at its forward side and disposed forwardly of the respective plate 180 and of larger size than an opening through the respective plate 180, a sample of such opening being shown at 194 on the left-hand side of FIG. 3 in which a plate 180 is shown with the respective blocking means 190 removed for revealing in cross-section therebehind a section of the pivot support member 184.

The pivot support members 184 have their rearward ends welded to the upper sides of a later described horizontal attachment bar 200, whereby, as best seen in FIG. 3, the plates 180 normally hang in front of the notches 176, and yet a plate can be shifted out of this position by swinging it upwardly in the direction of a dotted arrow at 198 in FIG. 3 for removing the notched means 172 from around the hitching member 130 to separate the forward and rearward sections of the merchandise vehicle of this invention.

The notched members 172 are attached to the outer ends of a horizontally extending attachment bar 200 which forms a part of the attachment means 170 and a pivot post 202 which is threaded at its upper end is attached to and extends upwardly from the attachment bar 200 and extends through an opening 210 in the tongue 120 and also through a collar or bearing collar 220 which is attached to the upper side of the tongue 120 by welding at 222. A nut 226 is threadedly attached to the pivot post 202 and bears against the bearing collar 220 at the upper side of the latter, holding it in place, a lock nut 230 is attached to the uppermost part of the pivot post 202 and bears against the nut 226, making a permanent connection.

It is important to realize that the wheel means 50 under the riding platform and comprising the wheels 82 and 84 have undersurfaces disposed in a horizontal plane for engaging a supporting surface 300, such as the floor of a warehouse, across a sufficient part of the transverse width of the platform 42 as to provide substantial lateral stability to prevent the platform 42 from capsizing to one side thereof, the undersurface of the wheel means 50 extending both to the right and the left hand sides of the center of the platform, as seen in rear elevation in FIG. 5.

I have discovered that if the operator of the merchandise carrier of my invention gives one strong shove with one foot, he can go for 40 feet of coasting from a standing starting, this being true of both men and women.

One might assume from this that an operator would prefer just to take one shove every 30 or 40 feet in moving through a 300 or 400 foot warehouse. However, this is not the case. Instead, I have discovered that operators will find it much more easy and natural, when using the new carrier all day long, to use a full shove with the leg only for initial starting from a dead stop, and will thereafter prefer to use what I call "toe pushing."

"Toe pushing" is done by the operator standing with one foot on the platform in substantially a straight or erect posture with the leg of the foot that is on the platform either not flexed at all, or being scarcely or barely flexed or bent at the knee, while at the same time, the "toe pushing" leg is also substantially straight.

I have also discovered that a platform height of 2 ¾ inches above the floor is an ideal for making it possible for the operator to use the "toe pushing" principle with the leg that is on the platform substantially straight, which is the best for preventing it from becoming tired in a long day's work.

I have found that right-legged people prefer to do their "toe pushing" all day long with their right leg, and left-legged people will push all day long with their left leg, and so there is little variety to give rest, whereby it is important that the platform be of an ideal height so that very little rest is needed.

I have discovered that the average children's scooter is 4 ½ to 5 inches high which seems to go along with the propulsion system involving a full-leg push, but that a full-leg pushing is much more tiring over a period of 8 working hours.

It is my belief that this is somehwat similar to the ideal height of a stair of a stairway in which a variance of even one inch from an ideal, breaks the body's natural gait and will tire a person using the stairs a substantial period of time much quicker than would be the case with an ideal height.

The range of platform heights which I consider fitting with the "toe pushing" principle is from 3 and ¾ inches downward. The lower limit is only set by the need of clearance of framework members from the floor surface so they do not scrape on the floor.

I have discovered an ideal platform width is three inches wide, whereas children's scooters are only 1 ½ inches wide to 5 inches wide. This lesser width is also proven better in my research to go along with the propulsion principle "toe pushing" as distinguished from the type of pushing children do on scooters which is full-leg pushing.

"Toe pushing" involves small toe movements and is very frequently repeated, whereas "full-leg pushing" children do is much less often.

The reason a 3-inch platform is best with the "toe pushing" propulsion principle is because this makes it possible to stand with only one foot and never two on the platform, and yet, to reach down easily across the side of the platform with the toe of the propelling foot. An excess width of platform is in the way of pushing with the other foot. The greater range of width of the platform of 4 inches or less down to 2 inches works with the propulsion principles proposed herein, although the ideal is 3 inches.

The length of a platform could vary with the length of the foot of the operator, although a one-foot length is preferred.

The preferred tongue is made of steel of a substantial vertical thickness for providing vertical strength without excess width since it attaches to a platform that is preferably narrow.

I have discovered that a scooter with a platform height of 2 and ¾ inches is much preferred by both working women and working men to a scooter of similar construction which is 3 ½ inches high.

As best seen in FIGS. 3 and 5, the width of the platform 42 can be seen, by comparing a part of FIG. 5 which is present also in FIG. 3, namely, the tongue 120, to be of much lesser width from right to left than the attachment bar 200 of FIG. 3.

Figure 4:
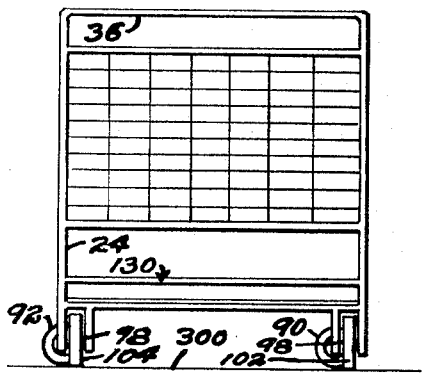
FIG. 4 is a frontal elevation of the rearward half portion of the vehicle, a rearward portion of the tongue and portions to the rearward thereof not being shown, and a righthand device for releasably attaching a notched member to the transverse hitch member of the forward half of the vehicle being shown in dotted lines in an open position, certain other parts being broken away to illustrate parts therebehind.

Since the attachment bar 200 of FIG. 3 is itself to be received on the hitch member 130 of container portion 12, as seen in FIGS. 2 and 4, the hitch member 130 is seen to be less than the entire length of the container portion 12. Therefore, it can be seen by these comparisons that the total span from right to left of the wheel means 50 (comprising wheels 56 and 58) is less than half of the width from right to left of the container portion 12.

Therefore, also it can be seen from these comparisons that the total width of the platform 42 and of its horizontal upper surface 46 is less than half of the width from right side to left side of the forward container portion 12.

I claim:

1. A standing occupant propelled merchandise cart comprising: a forward container portion having forward, rearward and side upright walls, and having an open upper side through which articles can be inserted and removed, a forward caster wheel means freely pivoting about a vertical axis to permit steering, and a rearward wheel means attached to and supporting said forward container portion, said rearward wheel means rotating about fixed axis means, handle means at the rear of said forward container portion and adapted to be gripped by a standing operator, an operator's riding platform elongated forwardly and rearwardly, a platform wheel means attached to the rearward end of and supporting said platform and having portions for engaging any horizontal surface which supports said platform wheel means at places horizontally spaced laterally of said platform for substantial sidewise tipping deterrent, means pivotally attaching said platform at its forward end to said forward container portion whereby an operator riding on said platform can steer said forward portion, said platform wheel means rotating about axis means which latter is substantially stationary with respect to a line at a right angle to the elongation of said platform, said platform being suitable for propulsion in the manner of a scooter, said wheel means under the forward container portion comprising rear wheel means and forward wheel means, said pivotal attaching means attaching the forward end of said platform attaching means to said container portion for the pivoting of said platform and said forward container portion normally in horizontal planes with respect to each other at a pivot point, said pivot point being disposed substantially at the center from side to side of said cart where the turning motions of said cart have the least effect in altering position of said pivot point, said platform having a width from right to left and said wheel means having a maximum span from the right side thereof to the left side thereof, and in which said width and span are each respectively substantially lesser in dimension than the width from right to left of said forward container portion, the top of said platform being substantially level when said platform wheel means and said container wheel means are on a horizontal surface, said platform being in a natural position for ease of standing thereon and also said handle means being in substantially a natural position for ease of gripping by an average operator while said operator is leg-propelling said cart in the manner of a scooter, the top of said platform being less than 3 ¾ inches from the underside of said wheel means for ease of toe-propulsion by a standing operator whose other foot is on said platform, said container portion forward wall being on a same horizontal level with said container portion rearward wall.

2. The combination of claim 1 in which said wheel means under said riding platform has sufficient undersurface for extending on both the right and left sides of a center of said platform.

3. The combination of claim 1 in which said wheel means under said riding platform has its undersurface disposed substantially at a same point with respect to the forward end of said riding platform for ease of turning said platform during steering.

4. The combination of claim 1 in which said wheel means under said riding platform specifically comprises two wheels spaced one on the left and one on the right of a center of said platform.

5. The combination of claim 1 in which said forward container portion has an elongated hitch member extending transversely across its rearward end and in which said riding platform is attached to said forward container portion by attachment means comprising two forwardly facing notched means receiving said hitch member therein, means releasably attaching said notched means to said hitch member, a vertical pivot member, means attaching said vertical pivot member to said attachment means, receiving means pivotally receiving said vertical pivot member, means attaching said receiving means to said platform.

6. The combination of claim 1 in which said platform has its upper surface disposed less than 3 ¾ inches above the undersurface of said second wheel means and in which the width of said platform along at least 8 inches of its length from its rearward end is less than 4 inches.

7. The cart of claim 1 in which said attachment means comprises a tongue attached to said platform and having a forward end having an underside spaced forwardly from and disposed above said platform to permit said platform to have a relatively lower height for ease of cart-propulsion by means of an operator's toe.

* * * * *